(12) United States Patent
Lu

(10) Patent No.: US 7,069,623 B2
(45) Date of Patent: Jul. 4, 2006

(54) TYING DEVICE

(75) Inventor: Jung Wen Lu, Taichung (TW)

(73) Assignee: Rachet Co., LTD, Taichung (TW)

( * ) Notice: Subject to any disclaimer, the term of this patent is extended or adjusted under 35 U.S.C. 154(b) by 77 days.

(21) Appl. No.: 10/924,130

(22) Filed: Aug. 24, 2004

(65) Prior Publication Data

US 2006/0042052 A1    Mar. 2, 2006

(51) Int. Cl.
*B25B 25/00* (2006.01)

(52) U.S. Cl. .................. 24/68 CD; 24/69 ST; 253/223

(58) Field of Classification Search ............ 24/68 CD, 24/69 CT, 70 ST, 71.1, 68 D; 254/237, 223, 254/238, 239, 217
See application file for complete search history.

(56) References Cited

U.S. PATENT DOCUMENTS

| 4,234,166 | A  | * | 11/1980 | Cederblad | ................ 24/68 CD |
| 4,268,012 | A  | * | 5/1981 | Ruehle et al. | ............... 254/223 |
| 6,467,755 | B1 | * | 10/2002 | Reilly et al. | ................. 410/100 |
| 6,824,121 | B1 | * | 11/2004 | Boice | ........................ 24/69 ST |
| 6,880,810 | B1 | * | 4/2005 | Hu | ............................ 24/69 ST |
| 6,966,543 | B1 | * | 11/2005 | Loudamy | .................... 254/223 |

* cited by examiner

*Primary Examiner*—Robert J. Sandy

(57) ABSTRACT

A tying device including a seat body, a ratchet wheel, a driving member, a shaft and a detent member. A shaft is passed through the seat body and connected with the ratchet wheel. The driving member is pivotally connected with the shaft. The driving member can be wrenched to engage the detent member with different ratchets of the ratchet wheel so as to wind or release a tying belt connected with the shaft.

12 Claims, 12 Drawing Sheets

TYING DEVICE

BACKGROUND OF THE INVENTION

The present invention is related to a tying device, and more particularly to a tying device which can be reciprocally driven and conveniently operated for winding and tightening a tying belt.

FIGS. 11 and 12 show a conventional tying device including a seat body 8. Two shaft holes 811 are formed on two sides 81 of the seat body 8 for a shaft 82 to pass therethrough. A driving member 83 is connected with one end of the shaft 82. The circumference of the driving member 83 is formed with several perforations 84 at equal intervals. The body of the shaft 82 is formed with a slot 85 for a tying belt to pass therethrough. After the shaft 82 is extended through the shaft holes 811, the other end of the shaft 82 is pivotally connected with a one-way ratchet 87. A detent block 88 is positioned above the ratchet 87 on outer side of the seat body 8 for dogging the ratchet 87.

In operation of the tying device, as shown in FIGS. 13 and 14, an operating bar (not shown) is inserted into the perforation 84 of the driving member 83 for wrenching the driving member 83. When the driving member 83 is wrenched, the shaft 82 is driven to gradually wind and tighten the tying belt 86. When released, the detent block 88 is turned to disengage from the ratchet 87. At this time, the shaft 82 is in an idle state, permitting the tying belt 86 to be pulled out.

The above tying device can tighten or release the tying belt 86. However, some shortcomings still exist in such tying device in operation. This is because that the tying device is mounted under the platform of a truck or a handcart. After turned to a certain angle, the operating bar will be hindered by the platform from being further turned. Under such circumstance, it is necessary to extract the operating bar and then reinsert the operating bar into another perforation 84 of the driving member 83 to further wrench the driving member 83. Such repeated insertion/extraction operation is quite inconvenient to an operator. Moreover, when releasing the tying belt 86, the operator needs to first wrench the driving member 83 with one hand to make the detent block no more engaged with the ratchet and separate the detent block 88 from the ratchet 87 with the other hand's fingers. Such operation is troublesome to the operator. Therefore, it is tried by the applicant to provide an improved tying device to solve the above problems.

SUMMARY OF THE INVENTION

It is therefore a primary object of the present invention to provide a tying device for tying cargoes. The tying device can be easily operated to quickly winding and tightening a tying belt.

According to the above object, the tying device of the present invention includes:

a seat body has two opposite sidewalls each of which is formed with a shaft hole for a shaft to pass therethrough, the shaft being formed with a slot for a tying belt to pass through, one end of the shaft being formed with a flange on outer side of one sidewall of the seat body;

a driving member pivotally connected with the end of the shaft;

a ratchet wheel fixed with the shaft between the driving member and the sidewall of the seat body, a rock arm radially outward extending from the driving member, a free end of the rock arm being pivotally connected with an engaging block, a cam section radially projecting from the driving member opposite to the rock arm, the cam section being slightly larger than the outer diameter of the ratchet wheel, the cam section having an outward projecting stopper block; and a detent member pivotally disposed on the sidewall of the seat body above the ratchet wheel, the detent member being engageable with the ratchet wheel, the detent member having a thickness larger than the thickness of the ratchet wheel, whereby an edge of the cam section can push the detent member to swing upward.

The present invention can be best understood through the following description and accompanying drawings wherein:

DETAILED DESCRIPTION OF THE PREFERRED EMBODIMENTS

Figure 1:
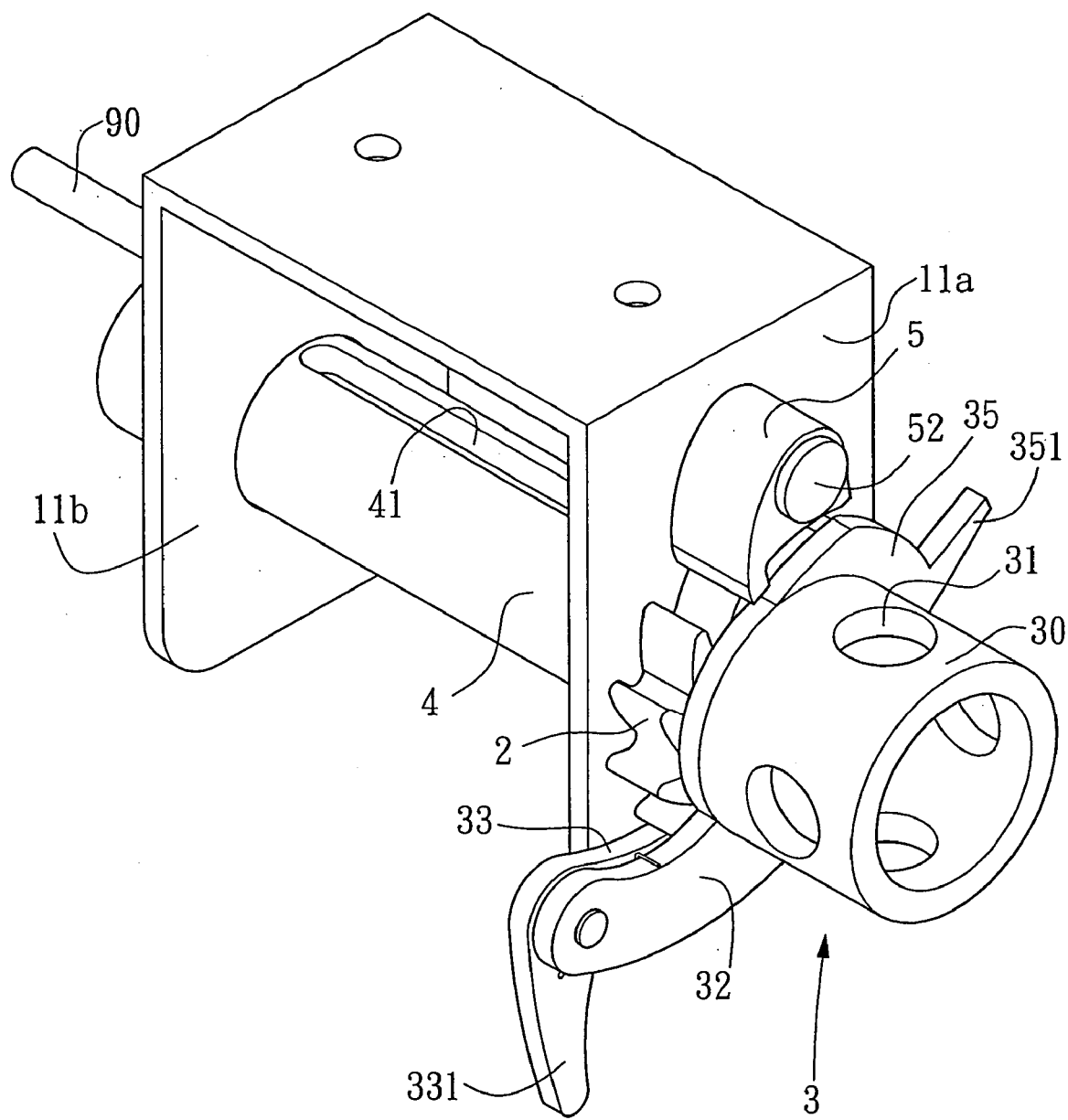
FIG. 1 is a perspective assembled view of the tying device of the present invention.
Figure 2:
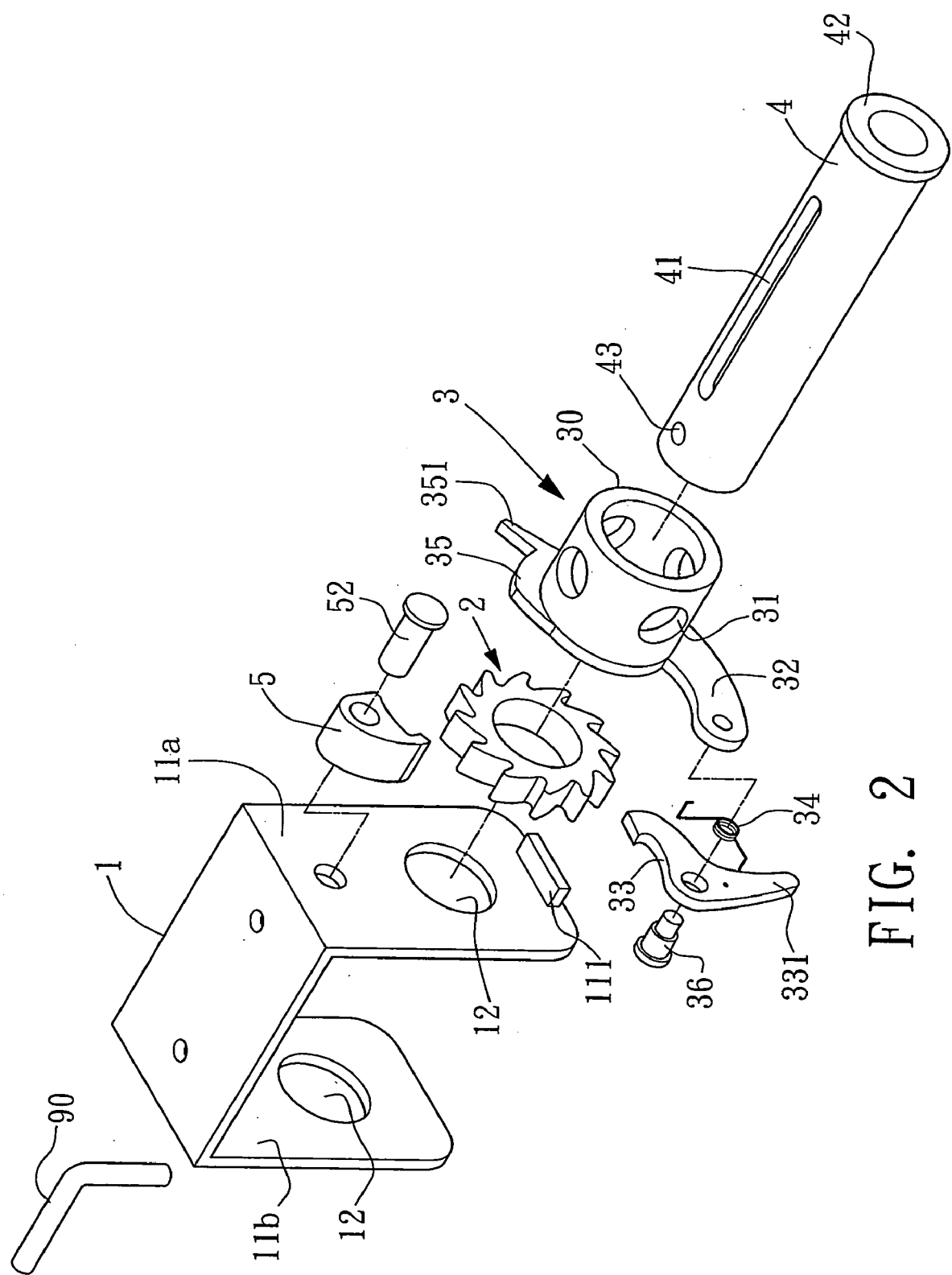
FIG. 2 is a perspective exploded view of the tying device of the present invention.
Figure 3:
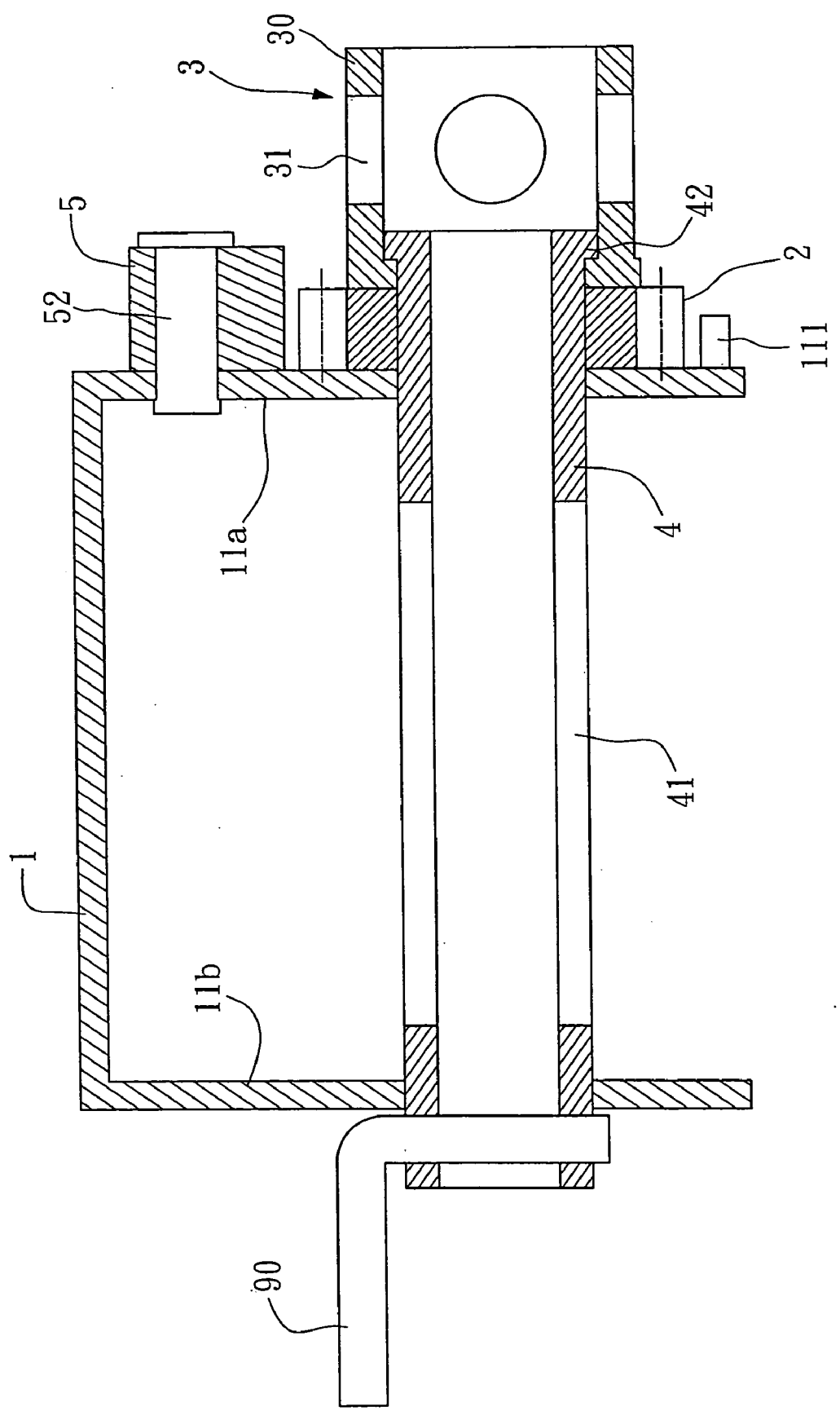
FIG. 3 is a sectional assembled view of the tying device of the present invention.

Please refer to FIGS. 1 to 6. The tying device of the present invention includes a seat body 1, a ratchet wheel 2, a driving member 3, a shaft 4 and a detent member 5.

The seat body has two opposite sidewalls 11a, 11b each of which is formed with a shaft hole 12 for a shaft 4 to pass therethrough. The shaft 4 is formed with a slot 41 for a tying belt to pass through. A transverse straight stopper section 111 outward projects from bottom end of the sidewall 11a. One end of the shaft 4 is formed with a flange 42 on outer side of the sidewall 11a of the seat body. The driving member 3 is pivotally connected with the end of the shaft 4. The ratchet wheel 2 is fixedly welded on the shaft 4 between the driving member and the sidewall 11a. In this embodiment, the driving member 3 has a cylindrical driving section 30. The circumference of the driving section 30 is formed with several circular holes 31 at intervals. In addition, a rock arm 32 radially outward extends from the circumference of the driving section 30. Via a pin 36, a free end of the rock arm is pivotally connected with an engaging block 33. A torque spring 34 is fitted on the pin 36 and clamped between the rock arm and the engaging block. The torque spring serves to force the free end of the engaging block to abut against the ratchet 21 of the ratchet wheel 2. In addition, a shift arm 331 extends from one side of the engaging block. The shift arm 331 and the engaging block 33 contain a certain angle.

A cam section 35 radially projects from the driving section of the driving member opposite to the rock arm 32. The cam section is slightly larger than the outer diameter of the ratchet wheel and has an outward projecting stopper block 351. Via a bolt 52, the detent member 5 is pivotally disposed on the sidewall 11a of the seat body above the ratchet wheel 2. The detent member 5 can engage with the ratchet wheel 2. The detent member 5 has a thickness larger than the thickness of the ratchet wheel, whereby an edge of the cam section 35 can abut against lower edge of the detent member 5.

The other end of the shaft 4 extends through the sidewall 11b of the seat body and is formed with a through hole 43. An L-shaped bar 90 is inserted in the through hole 43 and welded with the shaft 4. An operator can turn an exposed end of the L-shaped bar for quickly rotating the shaft so as to quickly wind the tying belt before tightened.

Figure 4:
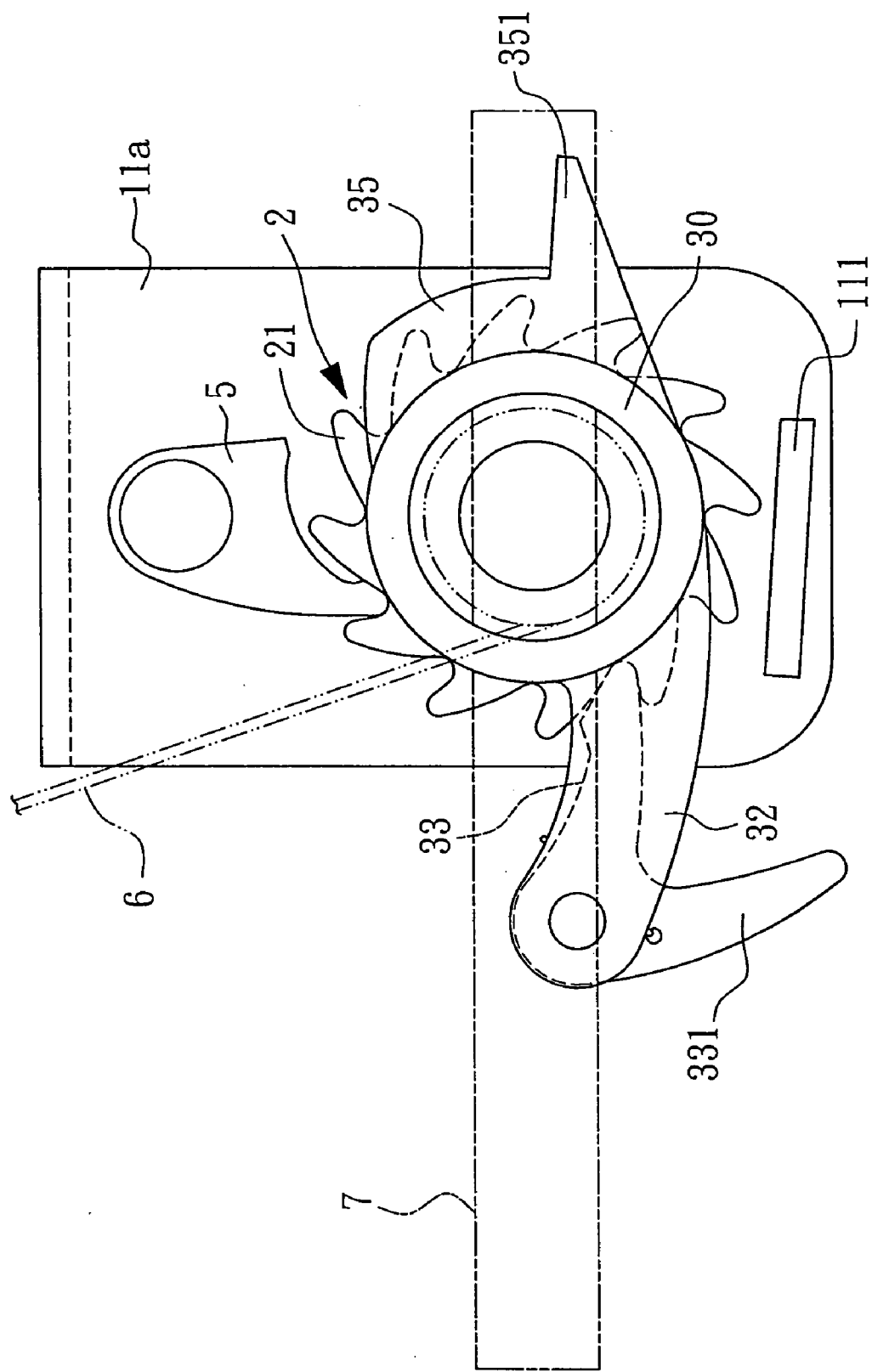
FIG. 4 is a plane view showing the operation of the tying device of the present invention.
Figure 5:
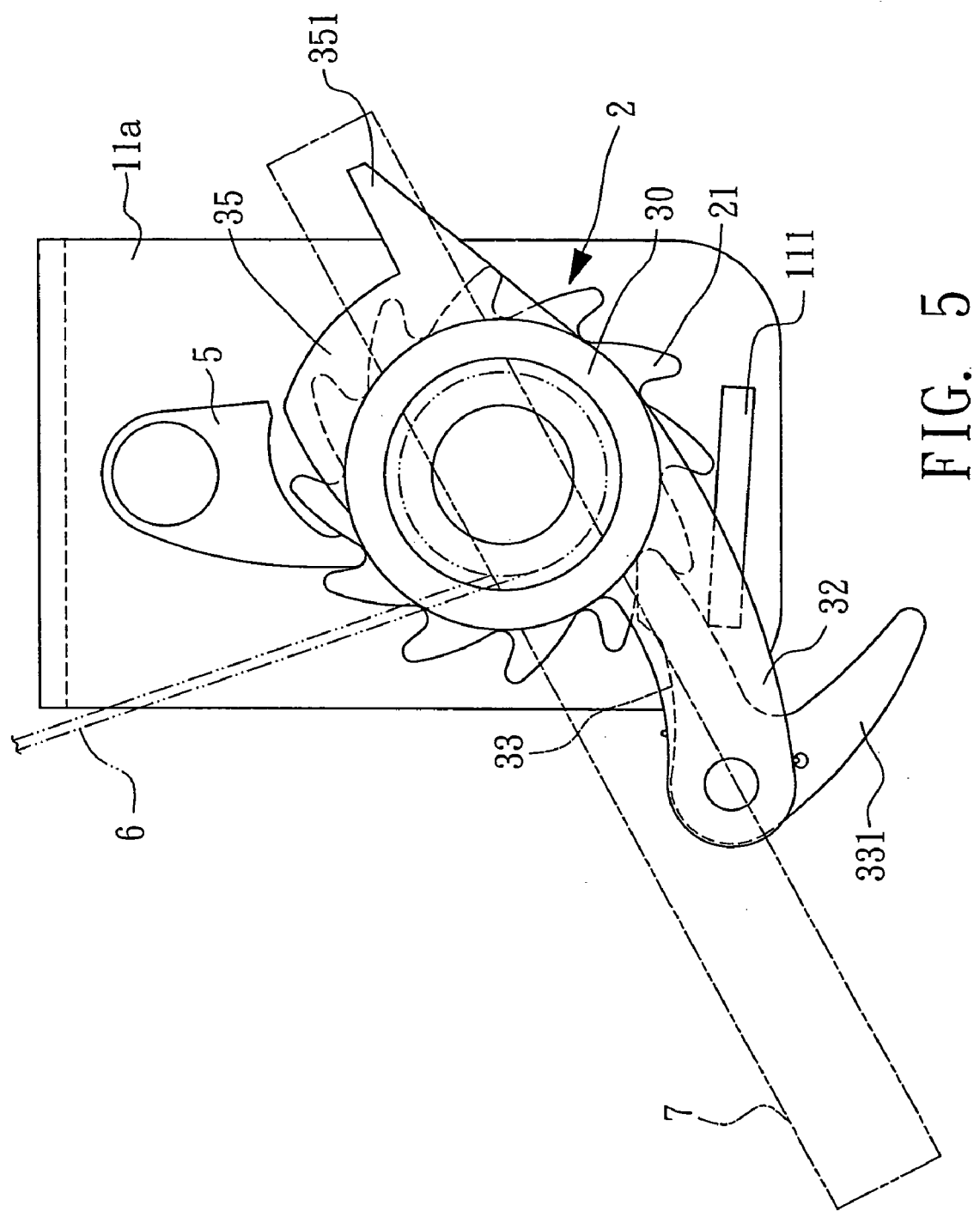
FIG. 5 is a view according to FIG. 4, showing that the tying belt is tightened.

FIGS. 4 and 5 show the operation of the tying device. An operating bar 7 is inserted into the circular hole 31 of the driving member 3 to serve as an application force arm. When turning the operating bar 7 downward, the driving member 3 is wrenched to make the engaging block 33 at the free end of the rock arm 32 push the ratchet 21 of the ratchet wheel 2. Accordingly, the ratchet wheel 2 is driven to rotate. When the ratchet wheel 2 is rotated, the detent member 5 engages with the ratchets of the ratchet wheel 2 one by one to prevent the ratchet wheel from backward rotating. After the operating bar 7 is turned downward to a certain extent, the operating bar 7 can be again turned upward. At this time, the engaging block 33 can slide-over the ratchets to go back to an upper ratchet of the ratchet wheel 2. Accordingly, the operating bar can be again turned downward to repeat the above operation until the tying belt 6 on the shaft 4 is gradually wound and tightened as shown in FIG. 5.

In the above winding operation, when the driving member 3 is wrenched to move the rock arm downward by a certain angle, the edge of the cam section will push the detent member. The outward projecting stopper section 111 at the bottom end of the sidewall 11a will stop the engaging block 33 to restrict the pivoting angle of the driving member 3. Accordingly, the detent member 5 is prevented from being unexpectedly pushed away from the ratchet of the ratchet wheel.

Figure 6:
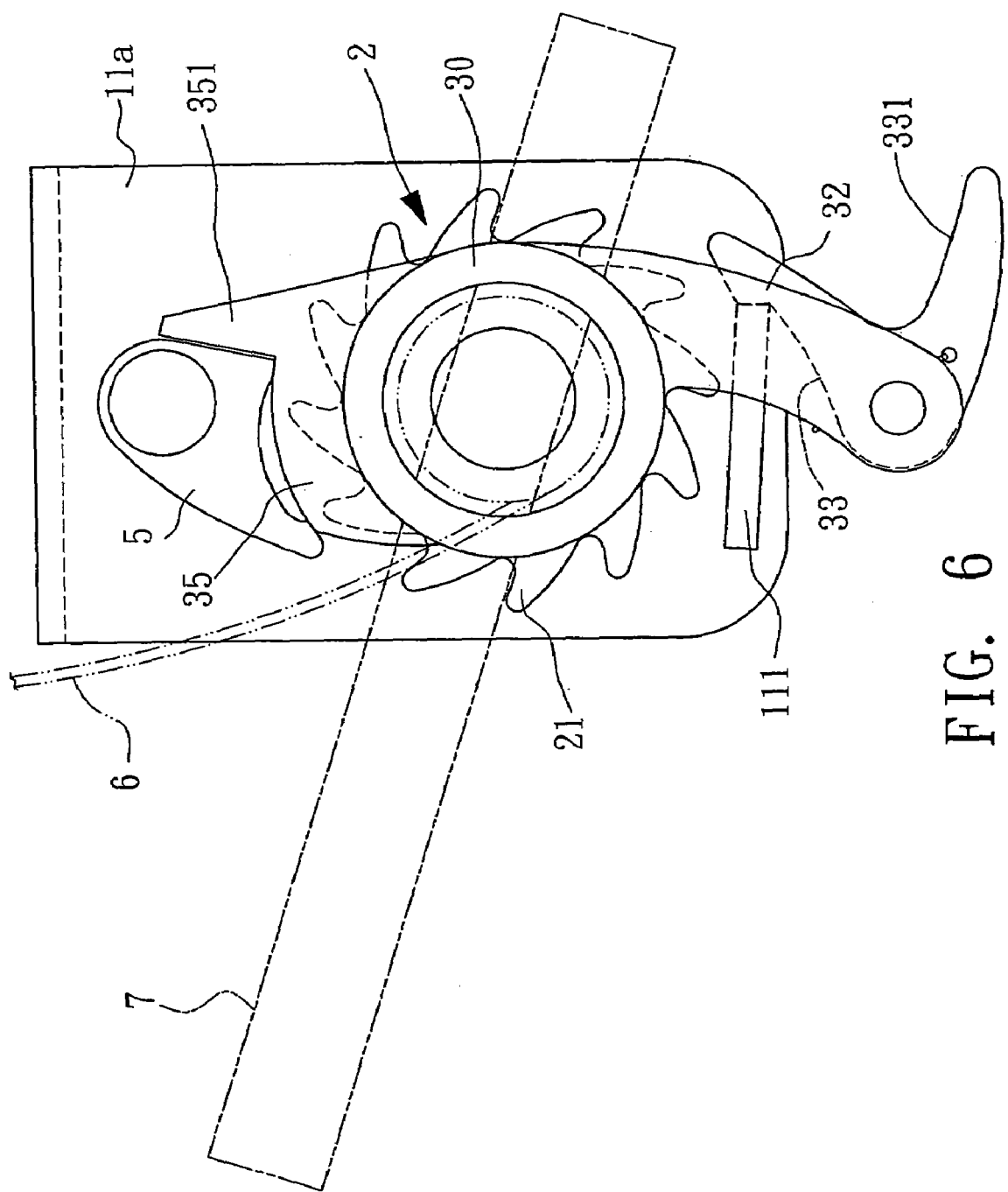
FIG. 6 is a view according to FIG. 4, showing that the tying belt is released.

When releasing the tying belt 6, the driving member 3 is wrenched downward to the stopper section 111 of the sidewall 11a. The shift arm 331 is turned upward to make the engaging block 33 hook right side of the stopper section 111 as shown in FIG. 6. At this time, the edge of the cam section 35 just pushes the detent member 5 to disengage from the ratchet 21 of the ratchet wheel 2 and the stopper block 351 gets close to outer face of the detent member. Accordingly, the shaft 4 is free from restriction and the tying belt 6 can be quickly released.

Figure 7:
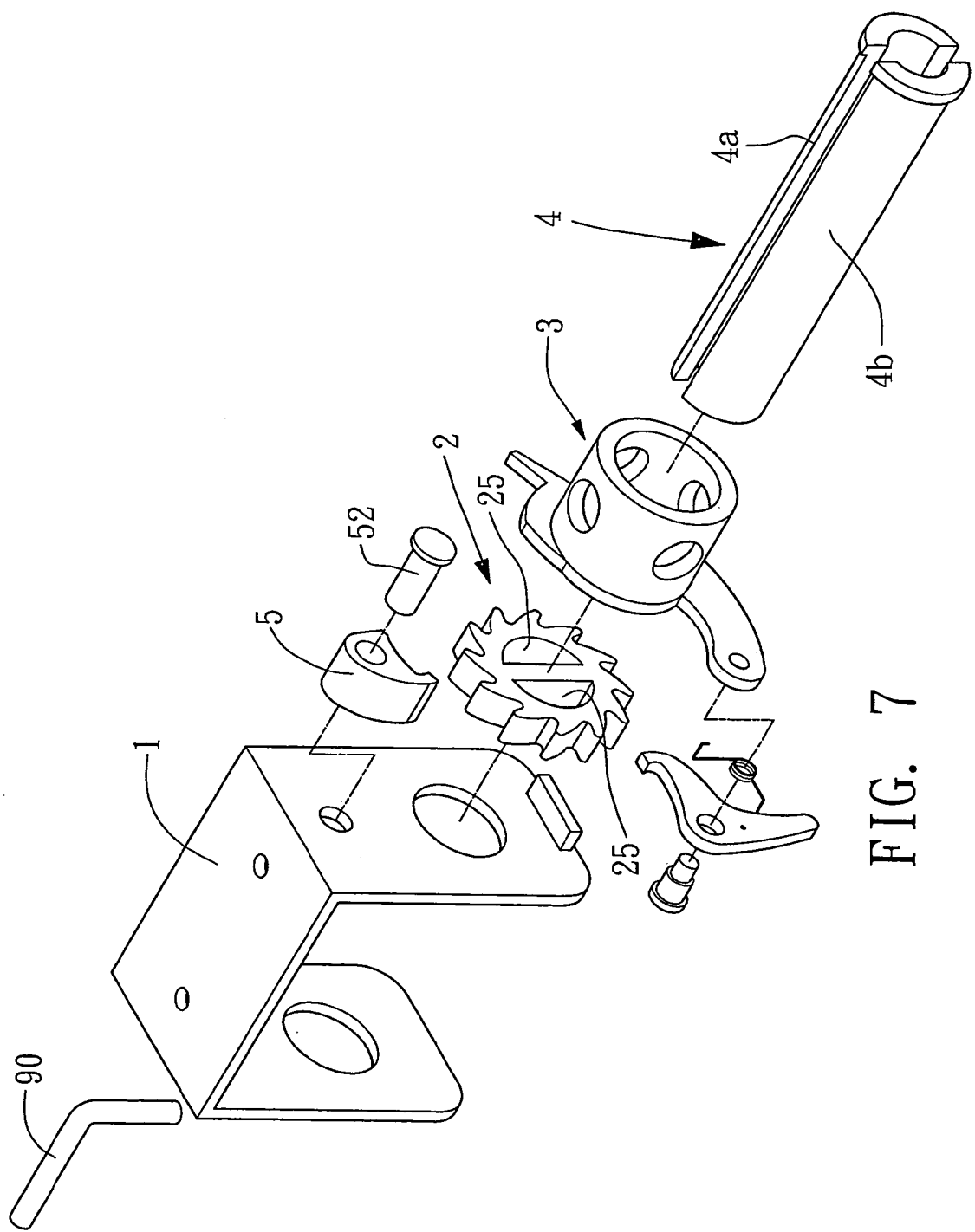
FIG. 7 is a perspective exploded view of a second embodiment of the tying device of the present invention.
Figure 8:
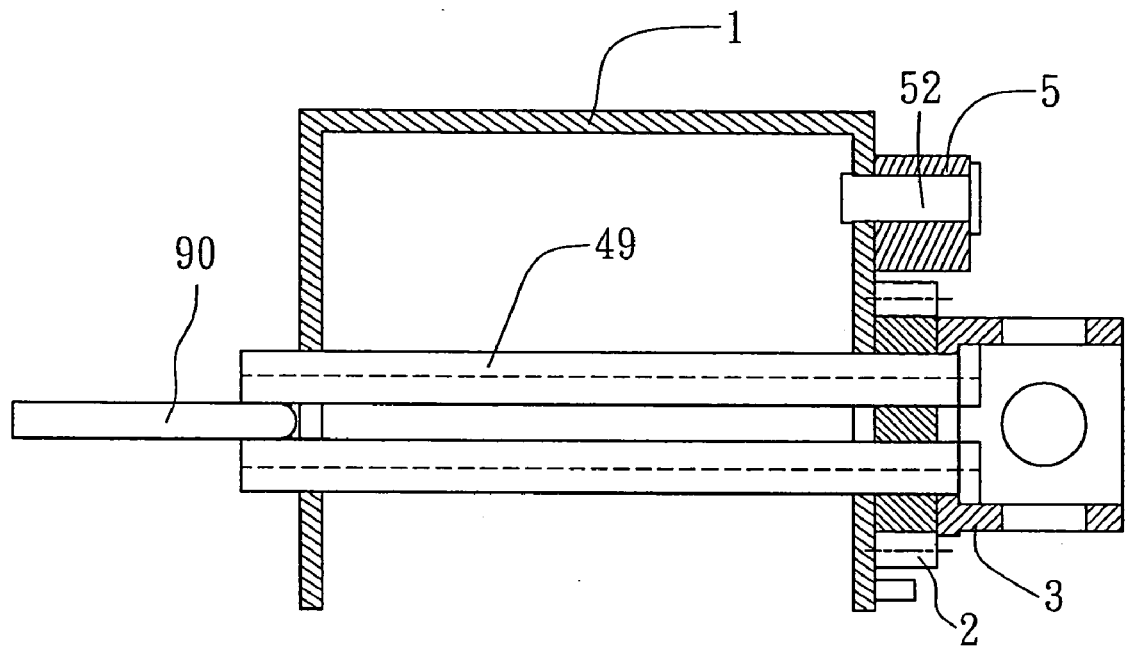
FIG. 8 is a sectional assembled view of the second embodiment of the tying device of the present invention.

FIGS. 7 and 8 show a second embodiment of the present invention, in which the seat body 1 and driving member 3 are identical to those of the first embodiment. The cross-face of the ratchet wheel 2 is formed with two semicircular holes 25. Two opposite semicircular slats 4a, 4b which form a circular shaft 4 are fitted through the two semicircular holes 25 of the ratchet wheel 2. An L-shaped bar 90 is inserted between the semicircular slats 4a, 4b and fixedly welded therewith. The semicircular slats 4a, 4b define therebetween a gap for a tying belt to pass through. The structure of the second embodiment is operable in the same manner as the first embodiment.

Figure 9:
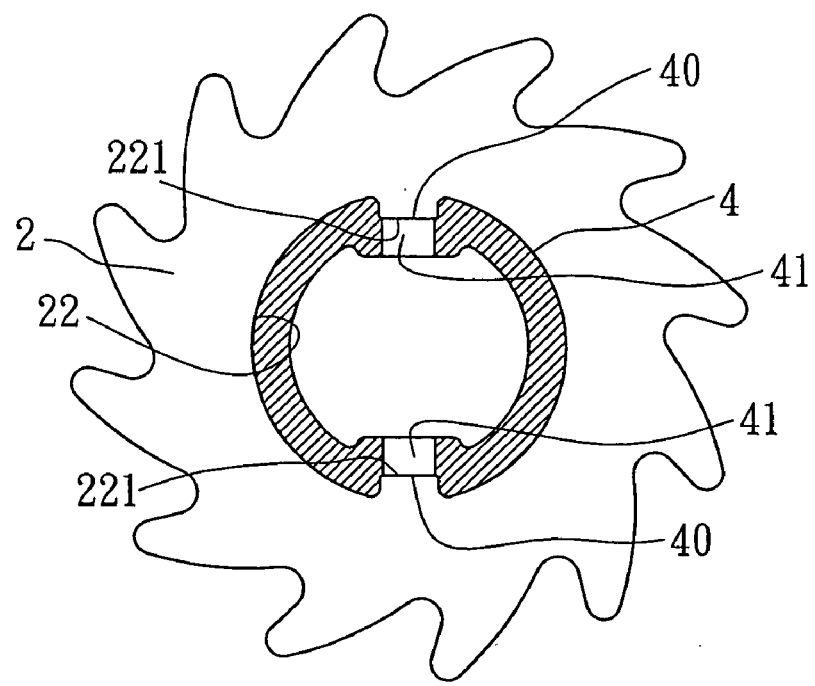
FIG. 9 shows a third embodiment of the tying device of the present invention in which the shaft is assembled with the ratchet wheel by a different measure.

Alternatively, as shown in FIG. 9, the surface of the shaft 4 is formed with two symmetrical grooves 40 axially extending from one end to the other end. The bottoms of the grooves 40 are formed with the slots 41. The center of the ratchet wheel is formed with a mounting hole 22 having a diameter approximately equal to the diameter of the shaft. The mounting hole 22 has teeth 221 corresponding to the grooves 40 for inserting into the grooves 40.

Figure 10:
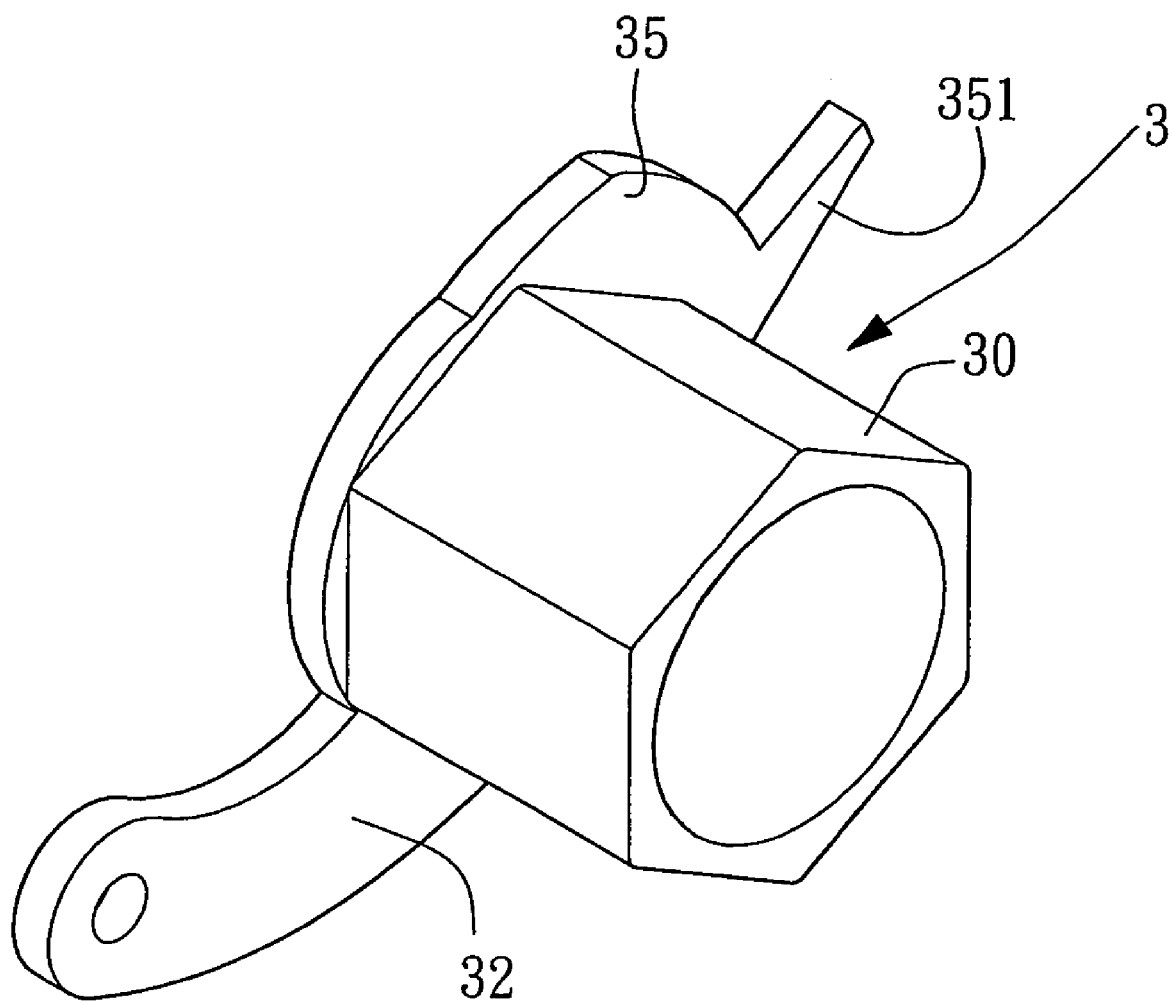
FIG. 10 shows a fourth embodiment of the tying device of the present invention in which the driving member has a polygonal column-shaped driving section.
Figure 11:
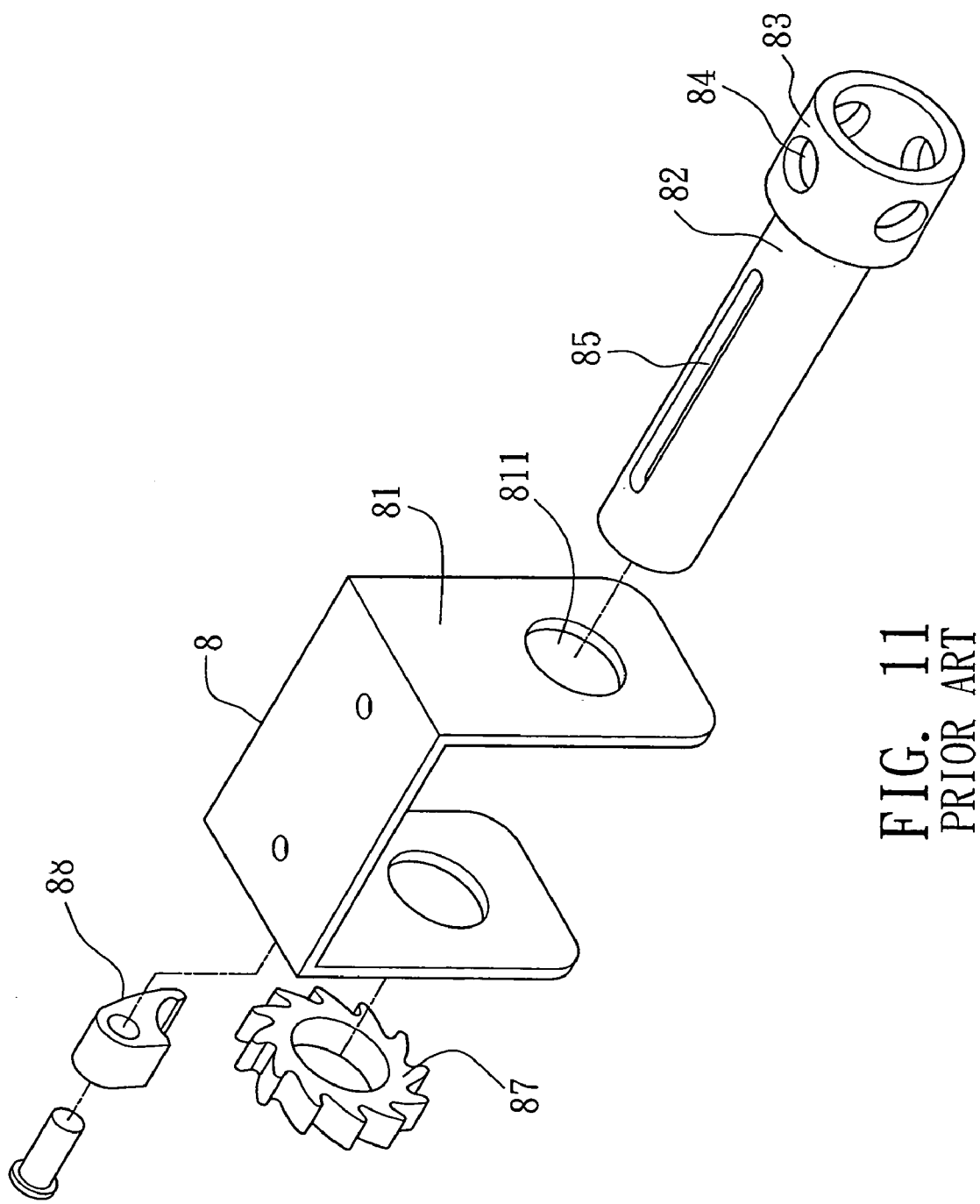
FIG. 11 is a perspective exploded view of a conventional tying device.
Figure 12:
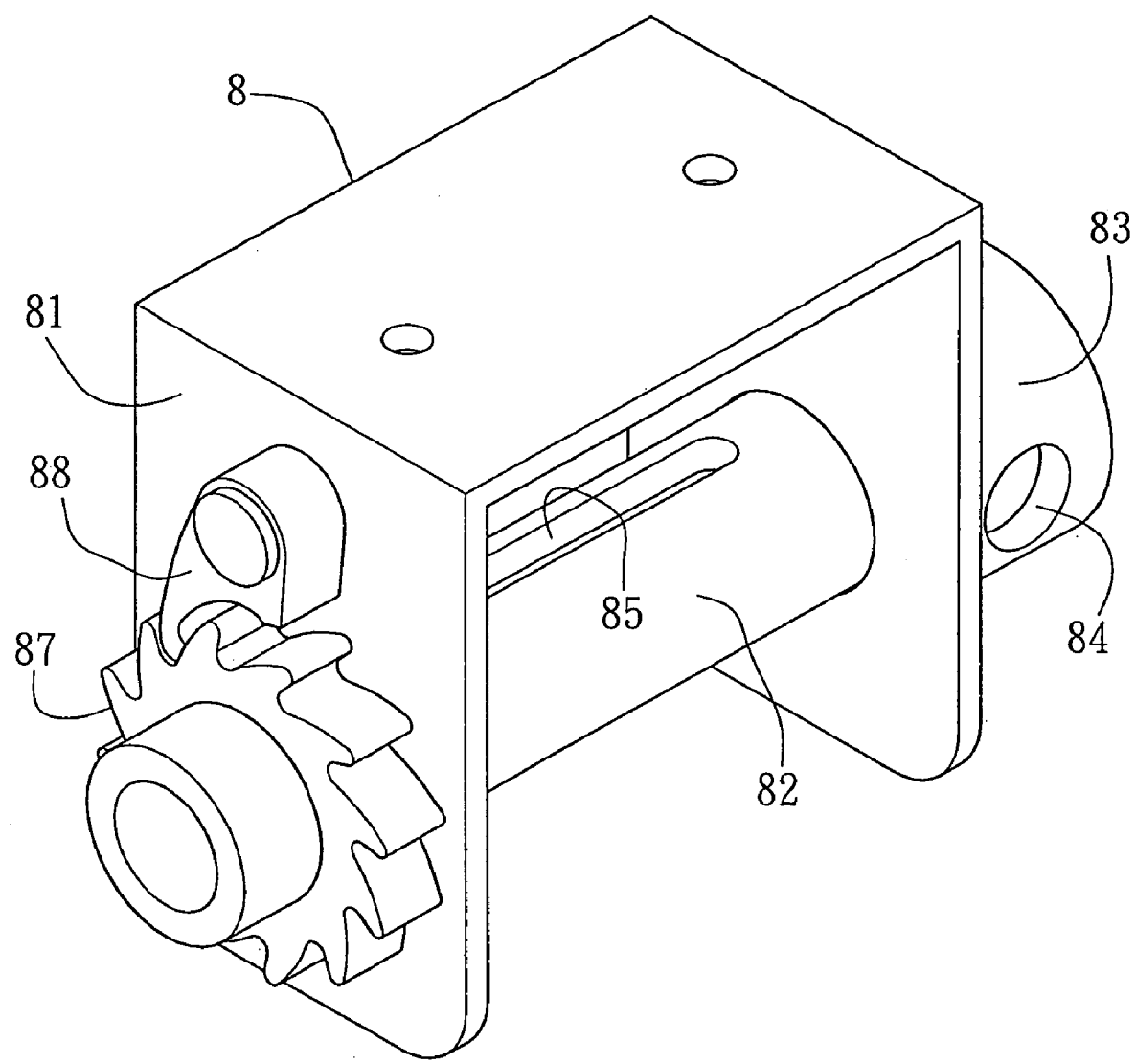
FIG. 12 is a perspective assembled view of the conventional tying device.
Figure 14:
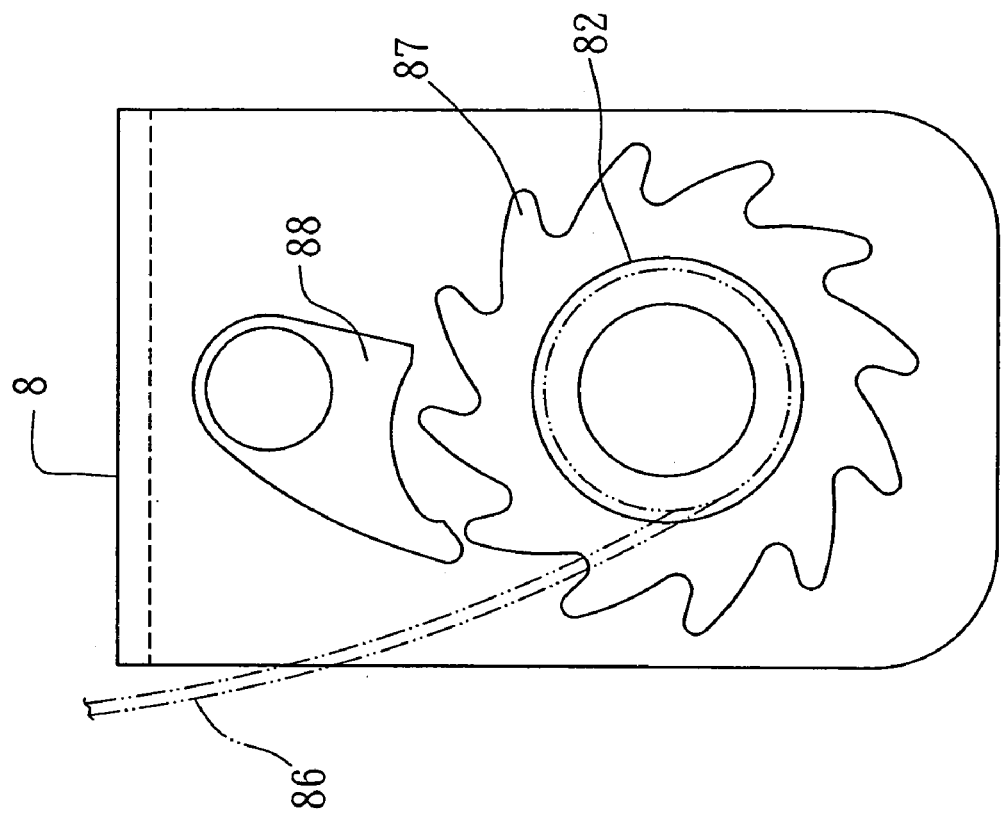
FIG. 14 is a view showing that the tying belt is released by the conventional tying device.
Figure 13:
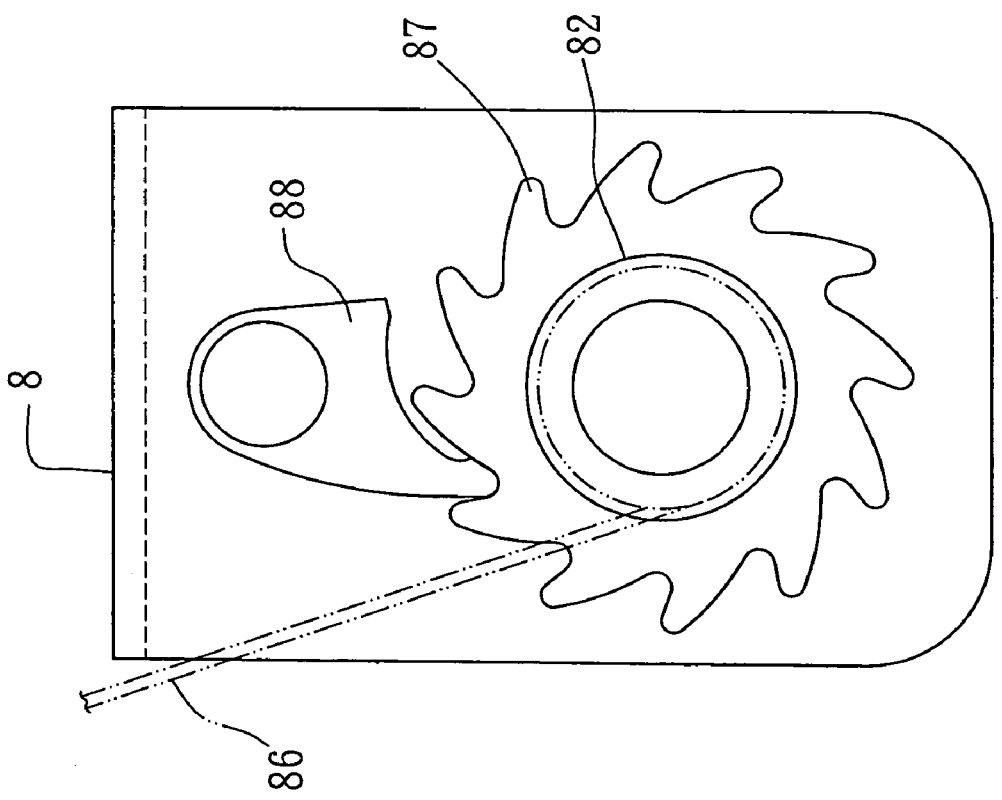
FIG. 13 is a view showing that the tying belt is tightened by the conventional tying device.

Still alternatively, in practice, the driving section 30 of the driving member can be a polygonal column as shown in FIG. 10. The driving section 30 is drivable by a large-size wrench.

The above embodiments are only used to illustrate the present invention, not intended to limit the scope thereof. Many modifications of the above embodiments can be made without departing from the spirit of the present invention.

What is claimed is:

1. A tying device comprising:
   a seat body having two opposite sidewalls each of which is formed with a shaft hole for a shaft to pass therethrough, the shaft being formed with a slot for a tying belt to pass through, one end of the shaft being formed with a flange on an outer side of one sidewall of the seat body;
   a driving member pivotally connected with the end of the shaft;
   a ratchet wheel fixed with the shaft between the driving member and the one sidewall of the seat body, a rock arm radially extending outward from the driving member, a free end of the rock arm being pivotally connected with an engaging block, a cam section radially projecting from the driving member opposite to the rock arm, the cam section being slightly larger than the outer diameter of the ratchet wheel, the cam section having an outwardly projecting stopper block; and
   a detent member pivotally disposed on the sidewall of the seat body above the ratchet wheel, the detent member being engageable with the ratchet wheel, the detent member having a thickness larger than the thickness of the ratchet wheel, whereby an edge of the cam section can push the detent member to swing upward.

2. The tying device as claimed in claim 1, wherein a stopper section outwardly projects from a bottom end of the sidewall, whereby when the edge of the cam section pushes the detent member, the stopper section stops the engaging block to restrict the pivoting angle of a driving member.

3. The tying device as claimed in claim 2, wherein the driving member has a cylindrical driving section, a circumference of the driving section being formed with several circular holes at intervals.

4. The tying device as claimed in claim 3, wherein a torque spring is disposed between the rock arm of the driving member and the engaging block.

5. The tying device as claimed in claim 4, wherein via a pin, the engaging block is pivotally connected with a free end of the rock arm, a shift arm extending from one side of the engaging block, the shift arm and the engaging block containing a certain angle.

6. The tying device as claimed in claim 1, wherein a surface of the shaft is formed with two symmetrical grooves axially extending from one end of the shaft, to the other end of the shaft, bottoms of the grooves being formed with two slots, a center of the ratchet wheel being formed with a mounting hole having a diameter approximately equal to the diameter of the shaft, the mounting hole having teeth corresponding to the grooves and for inserting into the grooves.

7. The tying device as claimed in claim 6, wherein a stopper section outwardly projects from bottom end of the one sidewall, whereby when the edge of the cam section pushes the detent member, the stopper section stops the engaging block to restrict a pivoting angle of the driving member.

8. The tying device as claimed in claim 7, wherein the driving member has a cylindrical driving section, a circumference of the driving section being formed with several circular holes at intervals.

9. The tying device as claimed in claim 8, wherein a torque spring is disposed between the rock arm of the driving member and the engaging block.

10. The tying device as claimed in claim 9, wherein via a pin, the engaging block is pivotally connected with the free end of the rock arm, a shift arm extending from one side of the engaging block, the shift arm and the engaging block containing a certain angle.

11. The tying device as claimed in claim 1, wherein the driving member has a polygonal column-shaped driving section.

12. The tying device as claimed in claim 1, wherein a cross-face of the ratchet wheel is formed with two semicircular holes, two opposite semicircular slats which form a circular shaft being fitted through the two semicircular holes of the ratchet wheel, an L-shaped bar being inserted between the semicircular slats and fixedly welded therewith, the semicircular slats defining therebetween a gap as a slot.

* * * * *